United States Patent [19]
Yamazaki

[11] Patent Number: 5,707,581
[45] Date of Patent: Jan. 13, 1998

[54] APPARATUS AND METHOD FOR PRODUCING PATTERNED MOLDED ARTICLES

[75] Inventor: Seiichi Yamazaki, Kyoto, Japan

[73] Assignee: Nissha Printing Co., Ltd., Kyoto, Japan

[21] Appl. No.: 507,404

[22] PCT Filed: Dec. 27, 1994

[86] PCT No.: PCT/JP94/02247

§ 371 Date: Aug. 28, 1995

§ 102(e) Date: Aug. 28, 1995

[87] PCT Pub. No.: WO95/18003

PCT Pub. Date: Jul. 6, 1995

[30] Foreign Application Priority Data

Dec. 28, 1993 [JP] Japan ................. 5-352665

[51] Int. Cl.⁶ ..................... B29C 45/14; B29C 45/16
[52] U.S. Cl. ................. 264/511; 264/153; 264/265; 264/266; 425/112; 425/122; 425/126.1; 425/129.1; 425/292; 425/302.1; 425/305.1
[58] Field of Search ................... 264/153, 265, 264/266, 511; 425/112, 122, 126.1, 129.1, 292, 302.1, 305.1

[56] References Cited

U.S. PATENT DOCUMENTS

| 4,269,579 | 5/1981 | Thomas | 425/112 X |
| 5,188,787 | 2/1993 | King et al. | 264/153 |

FOREIGN PATENT DOCUMENTS

| 0 329 792 | 8/1989 | European Pat. Off. |
| 4-278317 | 10/1992 | Japan |
| 5-301250 | 11/1993 | Japan |
| 6-315950 | 11/1994 | Japan |
| 91/17035 | 11/1991 | WIPO |

OTHER PUBLICATIONS

Patent Abstracts of Japan, vol. 016, No. 293 (M–1273), 29 Jun. 1992 & JP-A-04 080008 (Dainippon Printing Co. Ltd.), 13 Mar. 1992, *abstract*.

Patent Abstracts of Japan, vol. 011, No. 356 (M–644), 20 Nov. 1987 & JP-A-62 134231 (Showa Denko KK), 17 Jun. 1987, *abstract*.

*Primary Examiner*—Leo B. Tentoni
*Attorney, Agent, or Firm*—Wenderoth, Lind & Ponack

[57] ABSTRACT

An apparatus for producing patterned molded articles includes an injection mold composed of a first mold and a second mold, an unwind roll for unwinding a continuity of pattern film, a film introducing device for introducing the pattern film unwound from the unwind roll to between the first mold and the second mold, and a main clamp for pressing the pattern film against a surface of the first mold. A cutting device is provided on the upstream side of the surface of the first mold and serving for cutting off the pattern film, and a sub-clamp provided on the downstream side of the surface of the first mold and serving for fixing a cut-off end portion of the pattern film. The film introducing device has a pinch device for grasping the cut-off end portion of the pattern film and a driving device for reciprocatingly moving the pinch device.

19 Claims, 15 Drawing Sheets

APPARATUS AND METHOD FOR PRODUCING PATTERNED MOLDED ARTICLES

TECHNICAL FIELD

The present invention relates to an apparatus and method for producing patterned molded articles to be used for front panels or buttons of audio-visual equipment, dashboards or buttons of automobiles, and the like.

BACKGROUND ART

Conventionally available apparatuses for producing patterned molded articles are classified into (1) so-called sheet-feed type injection molding and simultaneously patterning apparatuses and (2) so-called continuous type injection molding and simultaneously patterning apparatuses.

A sheet-feed type injection molding and simultaneously patterning apparatus of the former type (1) comprises an injection mold provided with a female mold having a recess and a male mold having a projection, and a clamp means for pressing a pattern film against a periphery of the recess of the female mold.

The method for producing patterned molded articles by using this apparatus comprises the following steps. First, a sheet-like pattern film is pressed against the periphery of the recess of the female mold by the clamp means. Then, the pattern film is put into close contact with the inner surface of the recess of the female mold by vacuum suction. In this state, with the female mold and the male mold closed, molten resin is injected, followed by mold opening, whereby a patterned molded article in which a pattern film is formed on the surface of the injection-molded product is obtained.

On the other hand, a continuous type injection molding and simultaneously patterning apparatus of the latter type (2) is one in which an apparatus for producing injection molded articles similar to the apparatus of the type (1) further comprises a first roll for continuously unwinding a pattern film to feed it to an injection mold, and a second roll for winding up the unwound pattern film.

The method for producing patterned molded articles by using this apparatus comprises the following steps. First, a continuity of pattern film from the first roll to the second roll is fed into the injection mold, where only necessary portions of the pattern film are cut out and pressed against the periphery of the recess of the female mold by the clamp means. Then, the pattern film is put into close contact with the recess of the female mold by vacuum suction. In this state, with the female mold and the male mold closed, molten resin is injected, followed by mold opening, whereby a patterned molded article in which a pattern film is formed on the surface of the injection-molded product is obtained, while the pattern film whose necessary portions have been cut out is wound up by the second roll.

However, the conventional apparatuses have had the following disadvantages.

In the type (1) apparatus, since pattern films cut into sheets are used, it is impossible to keep a certain level of tension applied to the entire surface of the pattern film before pressing the pattern film against the female mold by the clamp means. On this account, when the pattern film, after being pressed against the female mold by the clamp means, is vacuum-sucked into close contact with the inner surface of the recess of the female mold, the pattern film cannot be stretched uniformly over its entire surface, so that the pattern film with wrinkles and twists is put into close contact with the inner surface of the recess of the female mold. As a result, the pattern cannot be formed clearly on the surface of the injection molded article.

In the type (2) apparatus, on the other hand, since the pattern film is unwound from the first roll and wound up by the second roll, only necessary portions of the pattern film (four portions of the pattern film, i.e., upstream portion, downstream portion, and both side portions) must be cut out in such a way that the continuity of pattern film is not cut off. On this account, cutout chips are generated in such a large quantity that they cannot be fully prevented from entering the injection mold. Therefore, the resulting products are injection molded articles with cutout chips deposited, causing the rate of non-defective products to lower. Also, since more or less large margins must be allowed for both sides of the pattern film, larger amounts of waste film results, uneconomically. Further, since the second roll is necessitated for winding up the pattern film, the whole system is increased in size such that it becomes intricate to handle or high in cost.

Accordingly, an object of the present invention is to provide an apparatus for producing patterned molded articles and a method for producing patterned molded articles, which apparatus and method can solve the above disadvantages, and in which apparatus and method the pattern film can be put into close contact with the mold without causing wrinkles or twists of the film, and in which apparatus and method any film chips are suppressed from entering the mold, so that economic use of pattern films can be implemented.

SUMMARY OF INVENTION

To achieve the above object, according to an aspect of the present invention, there is provided an apparatus for producing patterned molded articles, which apparatus comprises:

an injection mold having a first mold and a second mold;

an unwind roll means for unwinding a pattern film;

a film introducing means for introducing the pattern film unwound from the unwind roll means to between the first mold and the second mold in a direction from an upstream side toward a downstream side of a surface of the first mold;

a first clamp means located between the first mold and the second mold and serving for pressing the pattern film, which has been introduced by the film introducing means, against the surface of the first mold;

a cutting means disposed either at a specified position on the upstream side of the surface of the first mold or at a specified position of the first clamp means opposite to the upstream side, and serving for cutting off the pattern film on the upstream side of the surface of the first mold when the pattern film is pressed against the first mold by the first clamp means; and a second clamp means disposed on the downstream side of the surface of the first mold and serving for fixing a cut-off end portion of the pattern film;

wherein the film introducing means is so constructed to have a pinch means for grasping the cut-off end portion of the pattern film and a pinch means-driving means for reciprocatingly moving the pinch means between the upstream side and the downstream side of the first mold.

According to another aspect of the present invention, there is provided a method for producing patterned molded articles by using the aforementioned apparatus for producing patterned molded articles, which method comprises the steps of:

grasping the cut-off end portion of the pattern film by the pinch means;

moving the pinch means, which has grasped the cut-off end portion of the pattern film, with drive of the pinch means-driving means in a direction from the upstream side toward the downstream side of the surface of the first mold;

fixing the cut-off end portion of the pattern film by the second clamp means;

releasing the pattern film from the pinch means and withdrawing the pinch means from between the first clamp means and the first mold by the pinch means-driving means;

pressing the pattern film against the surface of the first mold by drive of the first clamp means and, at the same time, cutting off the pattern film on the upstream side of the surface of the first mold by the cutting means;

injecting molten resin into a cavity formed by mold-closing the first mold and the second mold; and releasing the pattern film from the first clamp means, thereby obtaining a patterned molded article.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
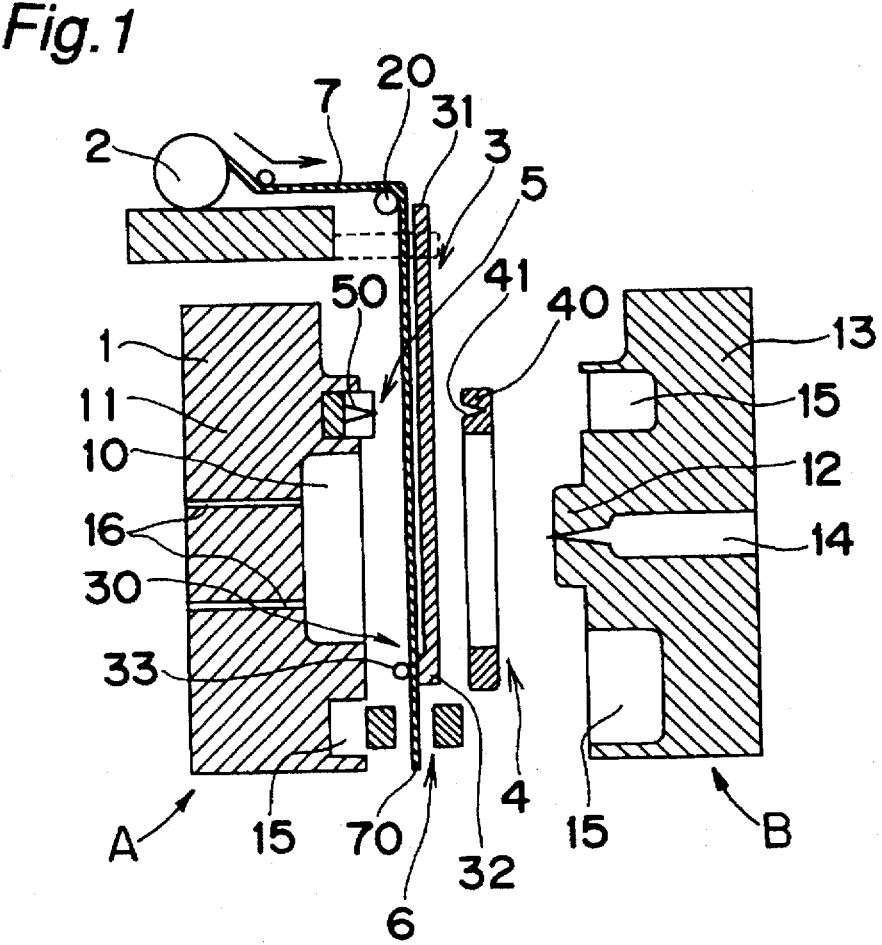
FIG. 1 is a schematic sectional view showing an apparatus for producing insert molded articles and one process of a method for producing insert molded articles, according to one embodiment of the present invention.

Before the description of the present invention proceeds, it is to be noted that like parts are designated by like reference numerals throughout the accompanying drawings.

Hereinbelow, one embodiment of the present invention is described in detail based on the accompanying drawings.

An apparatus for producing patterned molded articles according to one embodiment of the present invention fundamentally comprises an injection mold 1, an unwind roll means 2, a film introducing means 3, a main clamp means 4 as an example of a first clamp means, a cutting means 5, and a sub-clamp means 6 as an example of a second clamp means, where the unwind roll means 2 has a continuity of pattern film 7 wound therearound in a roll form. The film introducing means B comprises a pinch means 30 and a driving means 31.

The injection mold 1 comprises a first mold A having a surface against which the pattern film 7 is pressed by the main clamp means 4, which is later described, and with which the pattern film 7 is put into close contact by vacuum suction or pressure of molten resin, and a second mold B having a resin injection hole 14 for the molten resin. The first mold A and the second mold B, when closed to each other, form a cavity into which the molten resin is charged.

The first mold A of the injection mold 1 may be a female mold 11, whose surface to be put into close contact with the pattern film 7 is a female mold recess 10 (see FIG. 1). Otherwise, the first mold A may be a mold whose surface to be put into close contact with the pattern film 7 has a female mold recess 10, and which mold has at the female mold recess 10 a projection 18 projecting from the bottom surface of the recess and being higher than the depth of the female mold recess 10 (see FIG. 7). Further instead, the first mold A may be a mold whose surface to be put into close contact with the pattern film 7 has only the projection 18 (see FIG. 8).

Figure 7:
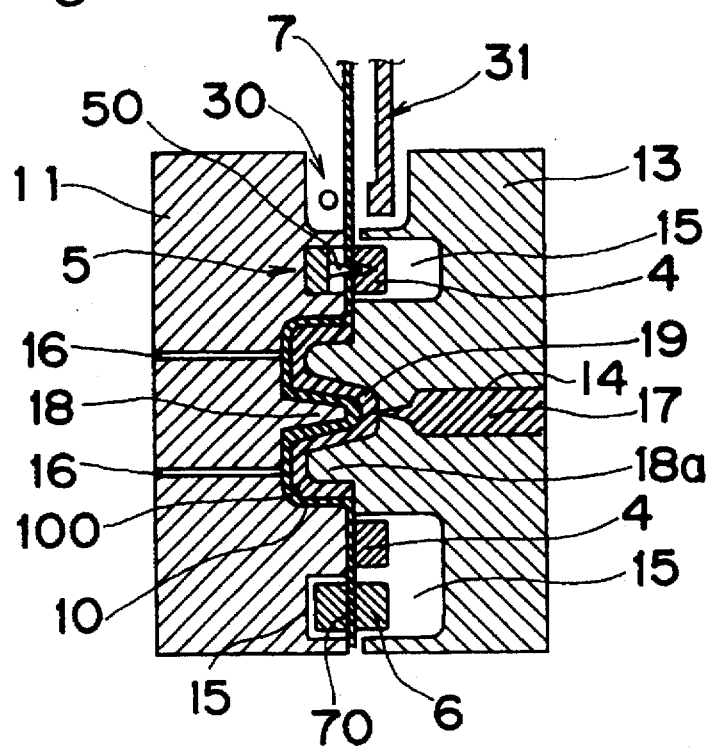
FIG. 7 is a schematic sectional view showing an injection mold in an apparatus and method for producing insert molded articles according to another embodiment of the present invention.
Figure 8:
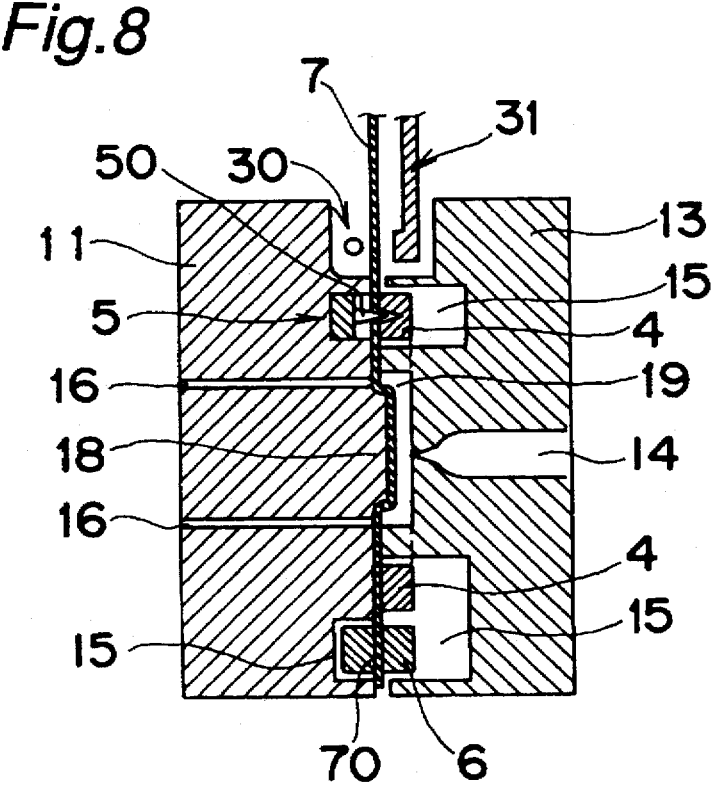
FIG. 8 is a schematic sectional view showing an injection mold in an apparatus and method for producing insert molded articles according to still another embodiment of the present invention.

The second mold B of the injection mold 1 may be a male mold 13, as shown in FIG. 1, which is used together with a female mold 11 having the aforementioned female mold recess 10 and which has a projection 12 that is to be entered into the female mold recess 10 at mold closure. Otherwise, the second mold B may be a male mold, as shown in FIG. 7, which is used together with a female mold 11 having a projection 18 in a female mold recess 10 and which has both a recess 19 into which the projection 18 of the female mold 11 enters at mold closure and a projection 18a that is to be entered into the aforementioned female mold recess 10 (see FIG. 7). Further instead, the second mold B may be a mold, as shown in FIG. 8, which is used together with the aforementioned first mold A whose surface to be put into contact with the pattern film 7 has only a projection 18, and which mold has only a recess 19 to have the aforementioned projection 18 entered at mold closure (see FIG. 8).

The following description will be directed to a case of an injection mold 1 in which a female mold 11 having a female mold recess 10 is used as the first mold A and a male mold 13 having a projection 12 is used as the second mold B.

The male mold 13 may also be provided with resin injection hole 14 for injecting molten resin 17 into a cavity that will be formed by mold closure with the female mold 11. The male mold 13 may also be provided with a clamp housing 15 for accommodating therein main clamp means 4 and sub-clamp means 6, which will be described later. The female mold recess 10 may have, at its inner surface, vacuum suction holes 16 for putting the pattern film 7 into close contact with the inner surface of the female mold recess 10. The female mold 11 may be provided with the clamp housing 15 for accommodating therein the sub-clamp means 6, which will be described later.

The unwind roll means 2 has a continuity of pattern film 7 wound therearound in a roll form and operates to continuously feed the pattern film 7 to between the female mold 11 and the male mold 13 of the injection mold 1. The unwind roll means 2 may be installed either directly on top of the injection mold 1 or on a base anchored to the ground independently of the injection mold 1. The pattern film 7 unwound from the unwind roll means 2 is introduced to between the female mold 11 and the male mold 13 via a guide roll 20 or the like.

The film introducing means 3 serves to introduce the pattern film unwound from the unwind roll means 2 to between the female mold 11 and the male mold 13, and comprises pinch means 30 and pinch means-driving means 31. The pinch means 30 serves to grasp a cut-off end portion 70 of the pattern film, and comprises a pinch head 32 and a pinch roll 33. The pinch head 32 and the pinch roll 33 are made of metal or the like. The pinch head 32 and the pinch roll 33 may pinch the pattern film in the form of either a plurality of dots or a line or a plane. The pinch head 32 and the pinch roll 33 are attached to the pinch means-driving means 31. The driving means 31 serves to move the pinch head 32 and the pinch roll 33 reciprocatingly between upstream and downstream sides of the female mold recess 10. An example of the pinch means-driving means 31 may be so devised that the rotation of a motor such as a stepping motor or a servo motor is linked with the rotation of a ball screw so that the rotation of the ball screw causes the pinch head 32 and the pinch roll 33 to move up and down. The stepping motor or servo motor constituting the pinch means-driving means 31 can be fine controlled for its direction of rotation, forward or reverse, as well as its rotating speed. Therefore, the film introducing means 3 may properly be used for the positioning of the pattern film 7 to a correct position on the female mold recess 10.

The pinch means-driving means 31 may be installed either at an upstream side (see FIG. 1) or at a downstream side (not shown) of the female mold recess 10. When it is installed downstream, the pinch means 30 will be pushed up or pulled down from below by the pinch means-driving means 31 so as to be entered or withdrawn from between the female mold 11 and the male mold 13. The pinch means-driving means 31 may be installed either directly on the female mold 11 of the injection mold or on a base anchored to the ground independently of the injection mold 1.

Figure 10:
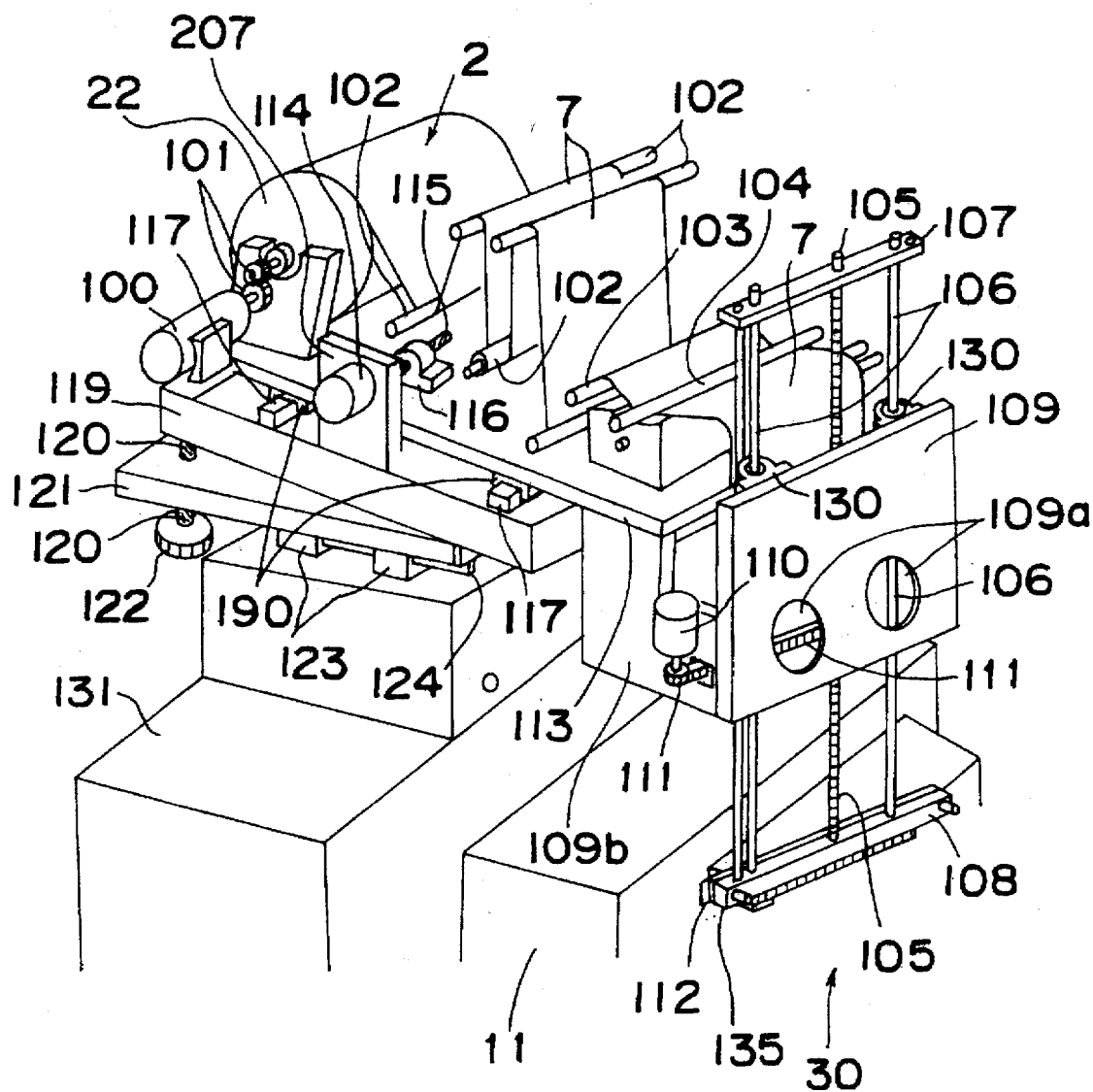
FIG. 10 is a schematic perspective view showing a more concrete example of the apparatus for producing insert molded articles according to FIG. 1.
Figure 25:
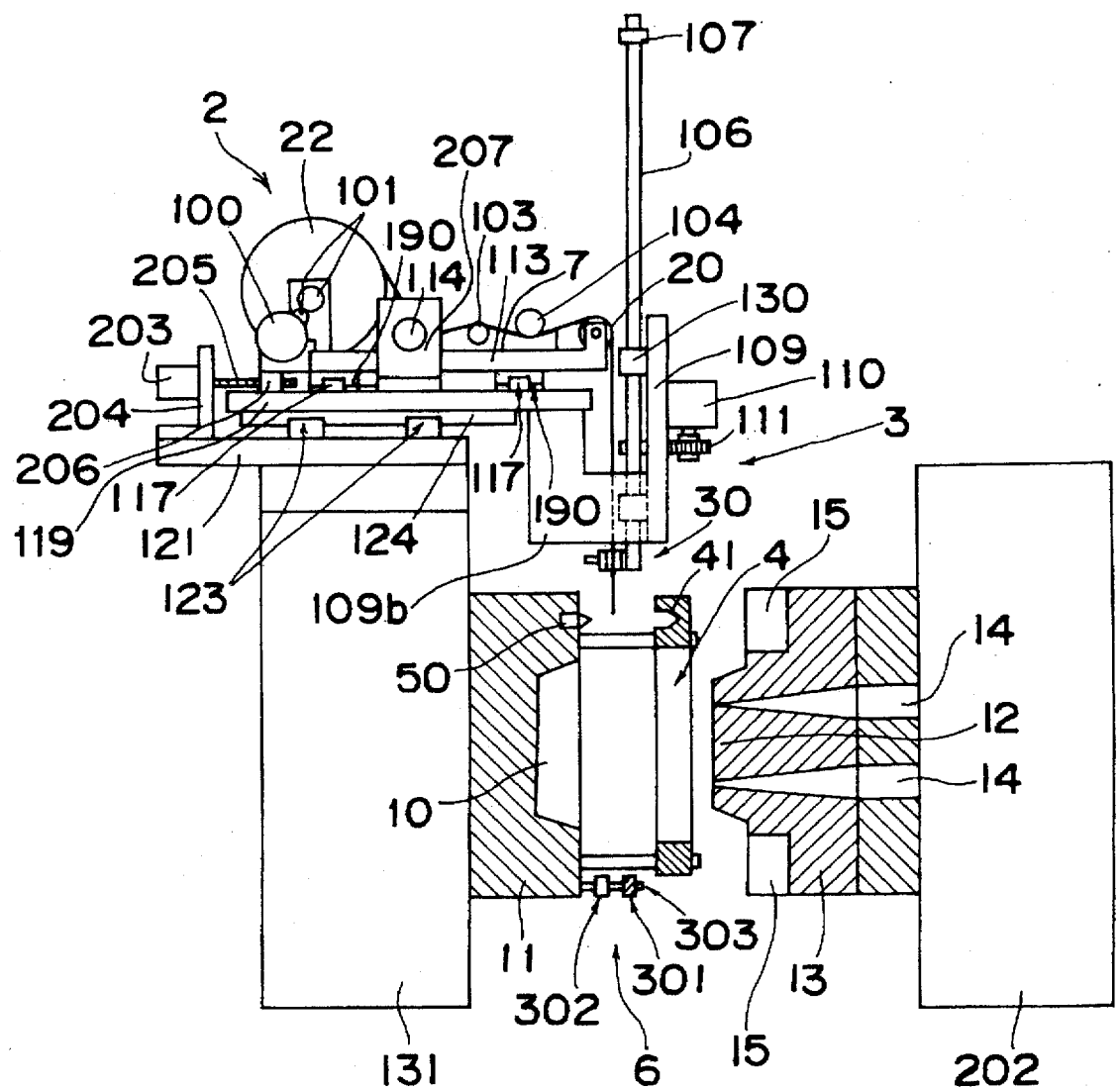
FIG. 25 is a schematic side view of the producing apparatus of FIG. 10.
Figure 28:
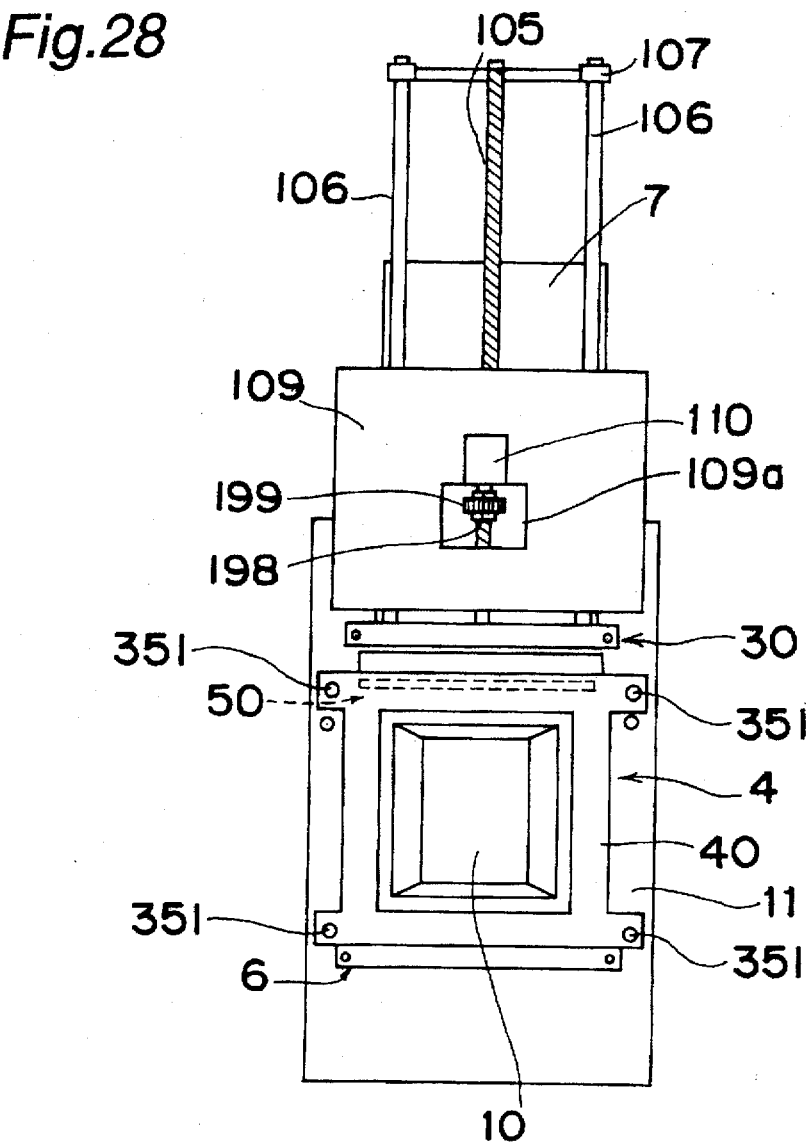
FIG. 28 is a schematic front view of the producing apparatus of FIG. 10.

FIGS. 10, 25, and 28 outline the entire producing apparatus as described above.

On a stationary plate 131 located behind the female mold 11, which is the first mold A, to fixedly support the female mold 11, there are provided a first slide table 121, a second slide table 119, and a third slide table 113 which form an adjustment mechanism for adjusting the position of the pattern film 7 with respect to the first mold A. Provided on the third slide table 113 are the unwind roll means 2 and the like. In addition, reference numeral 202 of FIG. 25 denotes a movable plate to which the male mold 13 is fixed, where the movable plate is movable with respect to the stationary plate 131.

The first slide table 121 has, on its lower surface, two parallel guide rails 124 while the stationary plate 131 has, on its upper surface, linear movement guides 123 for guiding the guide rails 124, so that the first slide table 121 is freely movable linearly with respect to the upper surface of the stationary plate 131. A drive motor 203 for rotationally driving a ball screw 205 extending parallel to guide rails 124 is fixed at an end of the first slide table 121 via a bracket 204, and a ball screw receiving member 206 into which is threaded the ball screw 205 is fixed to the second slide table 119. Thus, driving the drive motor 203 forward and reverse causes the ball screw 205 to be rotated forward and reverse, whereby the second slide table 119, to which the ball screw receiving member 206 is fixed, is moved along the guide rails 124 forward and backward with respect to the first slide table 121. As a result, the pinch means 30, the film introducing means 3, and the like can be adjusted to be put into or out of contact with the first mold A (female mold 11).

The second slide table 119 is disposed so as to 5 be tilted with respect to the first slide table 121. A grip 122 is disposed at an end of the first slide table 121. By turning this grip 122 by hand, a ball screw 120 is moved up and down with respect to the first slide table 121. Since an end of the ball screw 120 is in contact with the lower surface of the second slide table 119, the up-and-down movement of the ball screw 120 causes the rear end of the second slide table 119 to be moved up and down, so that the tilt angle of the second slide table 119 can be adjusted with respect to the first slide table 121. Accordingly, by this is angle adjustment mechanism, tilt angles of the pinch means 30 and the film introducing means 3 and others with respect to the first mold A (female mold 11) can be adjusted.

Two parallel guide rails 117 extending in a direction perpendicular to the direction in which the first slide table 121 moves with respect to the stationary plate 131 are provided on the lower surface of the third slide table 113, while linear movement guides 190 for guiding the guide rails 117 are provided on the upper surface of the second slide table 119, so that the third slide table 113 can freely move linearly with respect to the upper surface of the second slide table 119. A drive motor 114 for rotationally driving a ball screw 115 extending parallel to the guide rails 117 is fixed to an end of the second slide table 119 via a bracket 207, and a ball screw receiving member 116 into which is threaded the ball screw 115 is fixed to the third slide table 113. As a result, driving the drive motor 114 in forward or reverse rotation causes the ball screw 115 to rotate forward or reverse, which in turn causes the third slide table 113, to which the ball screw receiving member 116 is fixed, to move along the guide rails 117 forward and backward with respect to the second slide table 119. Thus, the pinch means 30, the film introducing means 3, and the like can be adjusted in their positions along the film widthwise direction with respect to the first mold A (female mold 11).

At the left end of the third slide table 113 in FIGS. 10 and 25 is disposed the unwind roll means 2. The unwind roll means 2 is so arranged that an unwind drum 22 around which the pattern film 7 is wound is rotated in the film-unwinding direction via gears 101 by the drive of a drive motor 100.

The pattern film 7 unwound from the unwind roll means 2 is guided in a zigzag manner by a plurality of turn rolls 102. Then, after the front and rear surfaces of the pattern film 7 are subjected to dust cleaning by adhesive turn rolls 103, 104, the pattern film 7 is sent onto the front surface of the first mold A by guide roll 20.

Figure 11:
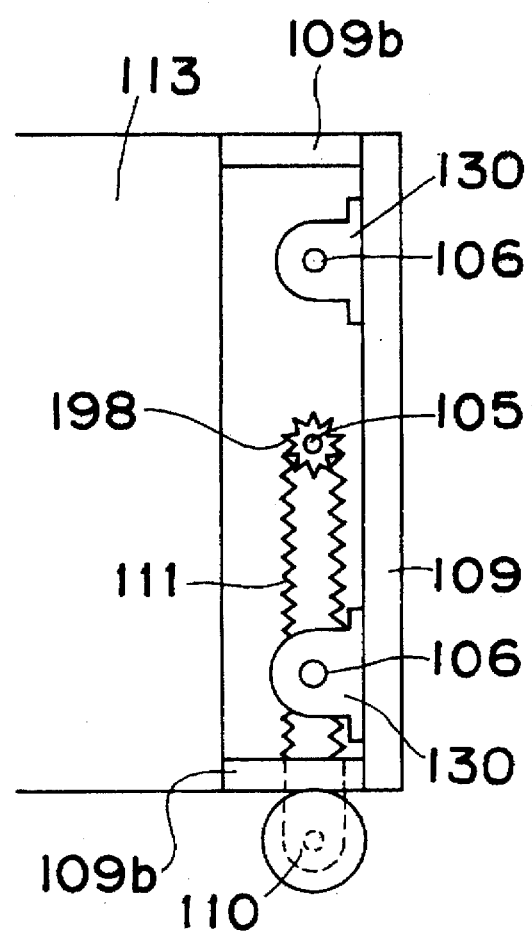
FIG. 11 is a partly enlarged plan view of the film introducing means-supporting member in the producing apparatus of FIG. 10.

To the right end of the third slide table 113 in FIGS. 10 and 25 is fixed by a pair of L-shaped brackets 109b a plate-shaped film introducing means-supporting member 109 having two circular observation holes 109a. As shown in FIGS. 10 and 11, the film introducing means-supporting member 109 guides a pair of vertically extending shafts 106 through shaft guides 130 in such a way that the shafts 106 can be moved up and down. An end bar 107 is installed between top ends of the shafts 106, while the pinch means 30 is provided at bottom ends of the shafts 106. Further, at an intermediate portion between the two shafts 106, a ball screw 105 is provided between the end bar 107 and the pinch means 30 in parallel to the shafts 106.

Of the two brackets 109b, one bracket 109b is provided with a servo motor 110 or the like constituting an example of the pinch means-driving means. This servo motor 110 operates in such a manner that forward and reverse rotation of a gear provided at an end of the axis of rotation of the motor causes a timing belt 111 engaged with the gear to be driven, where the timing belt 111 is engaged with a gear provided at the outer circumferential surface of a ball screw nut 198 rotatably supported by the support member 109. By the rotation of the ball screw nut 198, the ball screw 105 engaged with threads at the inner circumferential surface of the ball screw nut 198 is fed up and down so that the end bar 107, the shafts 106, and the pinch means 30, which are all linked with the ball screw 105, are moved up and down integrally while the shafts 106 are guided by the shaft guides 130.

A concrete example of the pinch means 30 is shown in FIGS. 12 through 16. The pinch means 30, which is fixed to the shafts 106, comprises a base 108 formed into a laterally elongated bar shape, a first pinch head 112 disposed opposite to the base 108, and a second pinch head 135 interposed between the base 108 and the first pinch head 112. An accordion type air cylinder 136 is provided between each end of the base 108 and each end of the second pinch head 135. Also, a spring 137 is provided between each end of the first pinch head 112 and each end of the second pinch head 135. With these springs 137, the second pinch head 135 is normally biased toward the base 108 so as to be moved generally in parallel by the guide of guide rods 181. Accordingly, each air cylinder 136 is expanded with air fed thereto, so that the second pinch head 135 is moved toward the first pinch head 112 away from the base 108 against the biasing force of the springs 137, whereby the interval between the first pinch head 112 and the second pinch head 135 is narrowed so that the pattern film 7 is pinched therebetween. On the other hand, each air cylinder 136 is contracted with air exhausted therefrom, so that the second pinch head 135 is approached to the base 108 land distanced farther from the first pinch head 112 by the urging force of the springs 137, whereby the interval between the first pinch head 112 and the second pinch head 135 is widened such that the Pattern film 7 having been pinched therebetween is released.

The main clamp means 4 is located between the female mold 11 and the male mold 13 and serves to press the pattern film 7, which has been introduced between the female mold 11 and the male mold 13, against the periphery of the female mold recess 10 of the female mold 11. The main clamp means 4 is preferably formed into a frame shape surrounding the periphery of the female mold recess 10 of the female mold 11, so that a space formed between the pattern film 7 and the female mold recess 10 is closed at a point in time when the pattern film 7 is pressed against the periphery of the female mold recess 10 of the female mold 11. For example, if the periphery of the female mold recess 10 is of a polygonal shape, then the main clamp means 4 results also in a polygonal shape. The space formed by the pattern film 7 and the female mold recess 10 does not need necessarily to be closed. If the space is not closed, it is appropriate to use an "=" shaped clamp means designed to press one end and the other of the female mold recess 10. If the periphery of the recess 10 of the female mold 11 is of a circular shape, the main clamp means 4 is also of a circular shape. A clamp head 40 at the upstream side of the main clamp means 4 may be provided with a cutting edge 50 for cutting off the upstream side of the pattern film 7, as will be described later (see FIG. 29) In this case, a cutting edge housing 350 may properly be provided on the surface of the female mold at the upstream side of the female mold recess 10. Otherwise, the upstream clamp head 40 of the main clamp means 4 may be provided with a cutting edge housing 41 (see FIGS. 1 and the like). In this case, the cutting edge 50 is provided at the upstream side of the recess 10 of the female mold 11.

Figure 29:
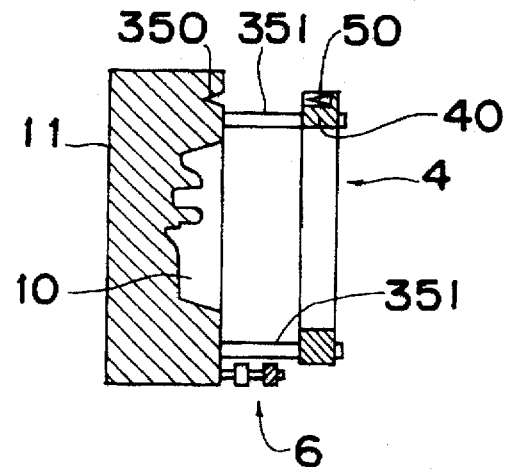
FIG. 29 is a schematic sectional view of the female mold, the main clamp means, and the sub-clamp means of the producing apparatus of FIG. 10.

The cutting means 5 is intended to cut off the pattern film 7, which has been introduced between the female mold 11 and the male mold 13, on the upstream side of the recess 10 of the female mold 11. The cutting means 5 is, for example, so arranged that the cutting edge 50 is provided on the surface of the female mold at the upstream side of the recess 10 of the female mold 11 while a recessed cutting edge housing 41 for receiving the cutting edge 50 is provided on the upstream clamp head 40 of the main clamp means 4, so that the main clamp means 4 presses the pattern film 7 against the female mold 11 and cuts it off at the same time. Otherwise, it may also be arranged that, as shown in FIG. 29, a recessed cutting edge housing 350 is provided on the surface of the female mold at the upstream side of the recess 10 of the female mold 11 while the cutting edge 50 is provided on the upstream clamp head 40 of the main clamp means 4. Further otherwise, it may be arranged that the cutting edge 50 is provided on the surface of the female mold 11 at the upstream side of the female mold recess 10 while the aforementioned cutting edge housing is provided on the male mold 13, so that the pattern film 7 is cut off simultaneously when the female mold 11 and the male mold 13 are closed. The cutting means does not need necessarily to be provided in the injection mold 1 or the main clamp means 4.

Figure 30:
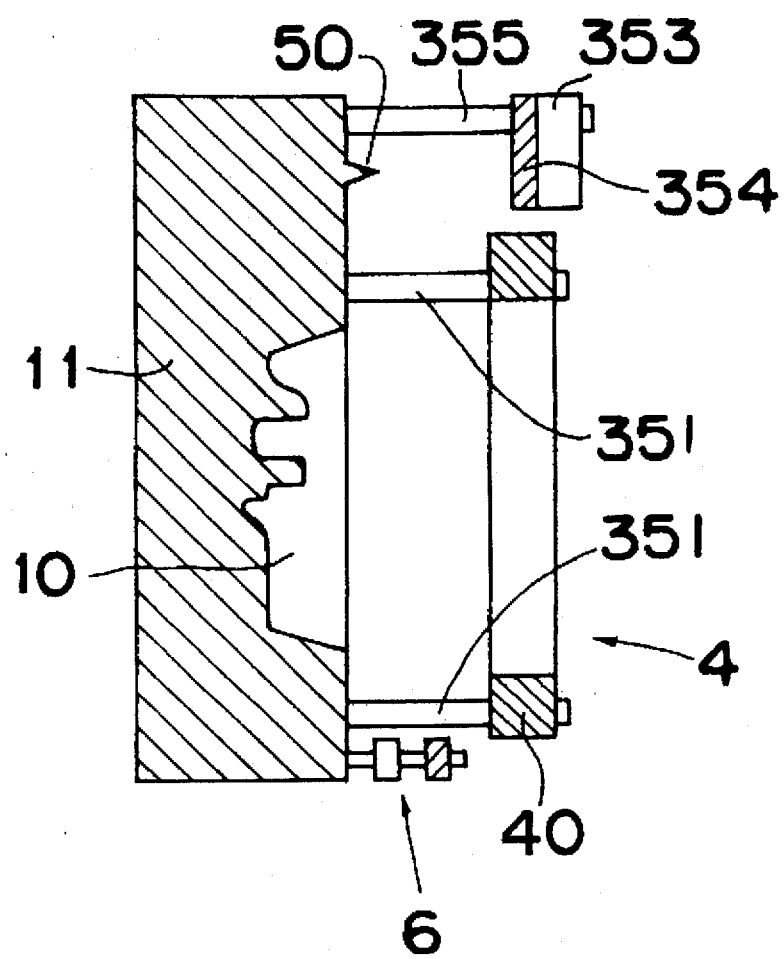
FIG. 30 is a schematic sectional view of a female mold, a main clamp means, and a sub-clamp means according to another embodiment of the present invention, which can be used in the producing apparatus of FIG. 10.

Further, it may also be arranged that, as shown in FIG. 30, the female mold 11 is provided with the cutting edge 50 as well as a cutting edge receiving member 353 linked with the main clamp means 4, so that when the receiving member 353 is moved by its pulling a guide rod 355 into the female mold 11 as well as by the drive of the main clamp means 4, the pattern film 7 is cut off by being pinched between a cutting edge receiving surface 354 made of rubber or polycarbonate at the surface of the receiving member 353, and the cutting edge 50. In this case, since the cutting edge 50 is received by the cutting edge receiving surface 354, it will not be damaged even though a cutting edge housing is not provided. In addition, in FIGS. 29 and 30, reference numeral 351 denotes four guide rods for guiding the main clamp means 4 when the main clamp means 4 moves relative to the female mold 11.

Figure 9A:
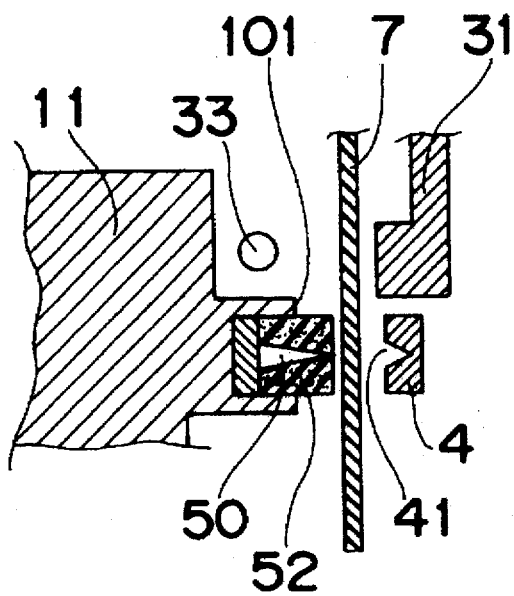
FIG. 9A is a schematic sectional view showing an apparatus and method for producing insert molded articles according to yet another embodiment of the present invention, in a state before the pattern film is put into contact with a cutting means.
Figure 9B:
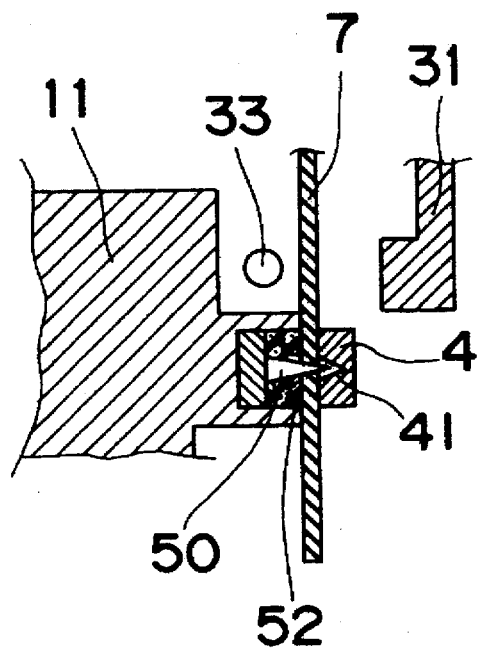
FIG. 9B is a schematic sectional view showing a state that the pattern film is in contact with the cutting means of FIG. 9A, where a sponge that has covered the cutting edge is pushed down while the pattern film is in contact with and being cut off by the cutting edge.

Actually, the cutting means 5 is in some cases so arranged that, as shown in FIG. 9A, the tip of the cutting edge 50 protrudes from the surface of the female mold and the protruding portion of the cutting edge 50 is covered with a sponge 52. The arrangement that the protruding portion of the cutting edge 50 is covered with the sponge 52 is implemented so that the pattern film 7 will not be erroneously cut off by coming into contact with the cutting edge 50 before the pattern film 7 is pressed against the surface of the female mold by the main clamp means 4. As shown in FIG. 9B, when the pattern film 7 is pressed against the surface of the female mold 11 by the main clamp means 4, the sponge 52 with which the tip of the cutting edge 50 is covered is pushed down by the pattern film 7, so that the tip of the cutting edge 50 is exposed whereby the pattern film 7 is cut off.

Figure 12:
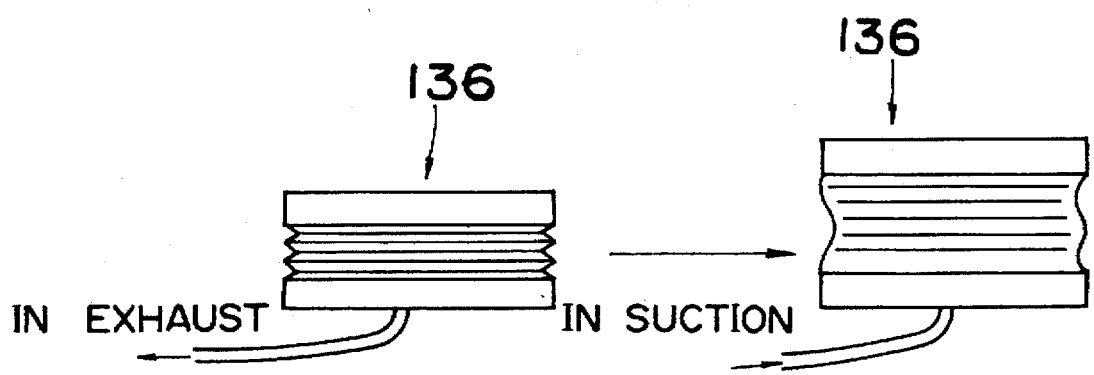
FIG. 12 is an explanatory view showing an accordion type air cylinder of a pinch means of the producing apparatus of FIG. 10, in its air exhaust and suction states.
Figure 13:
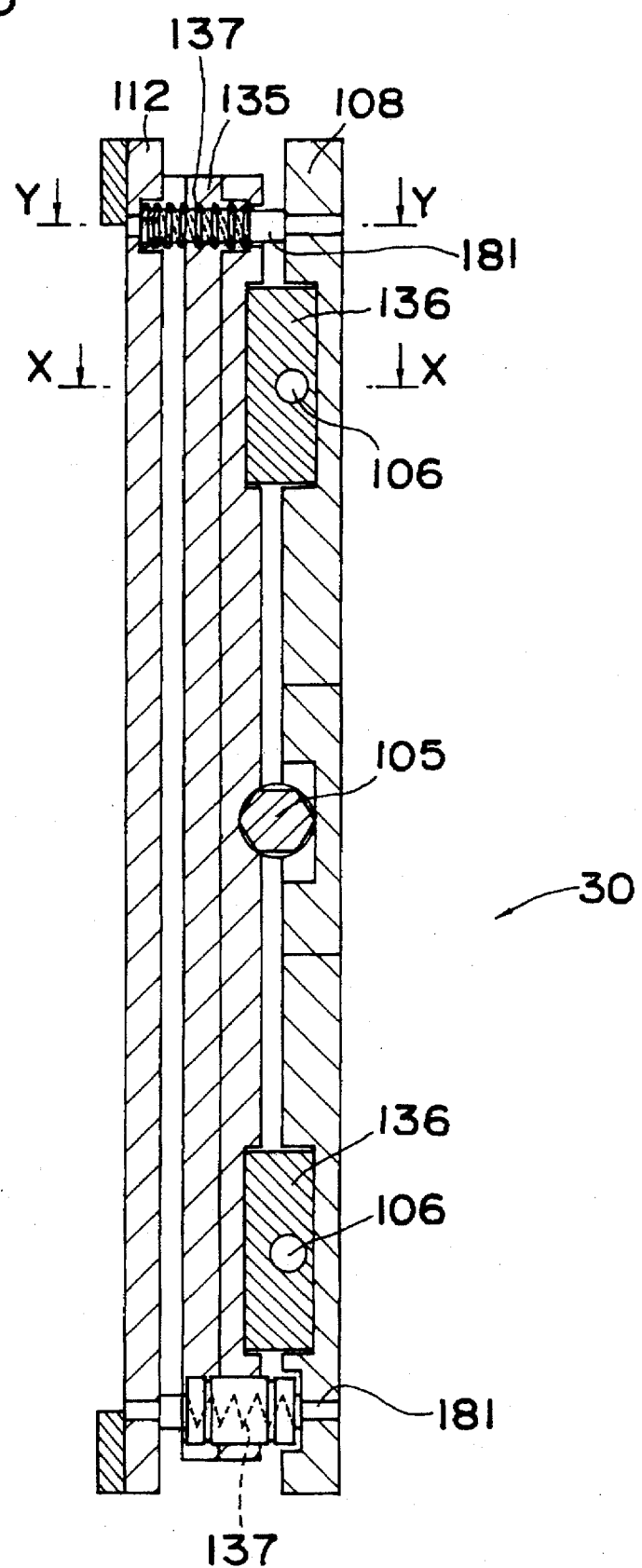
FIG. 13 is an enlarged plan view of the pinch means of the producing apparatus of FIG. 10.
Figure 14:
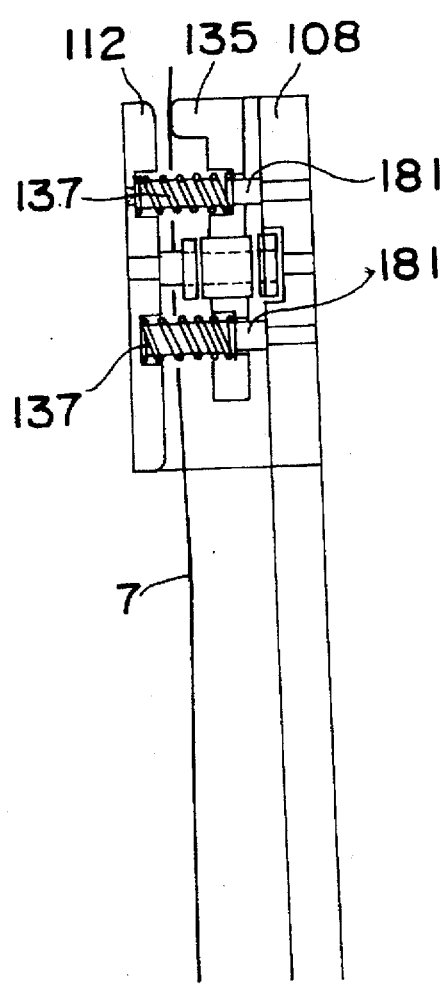
FIG. 14 is a sectional view taken along the line Y—Y of FIG. 13.
Figure 15:
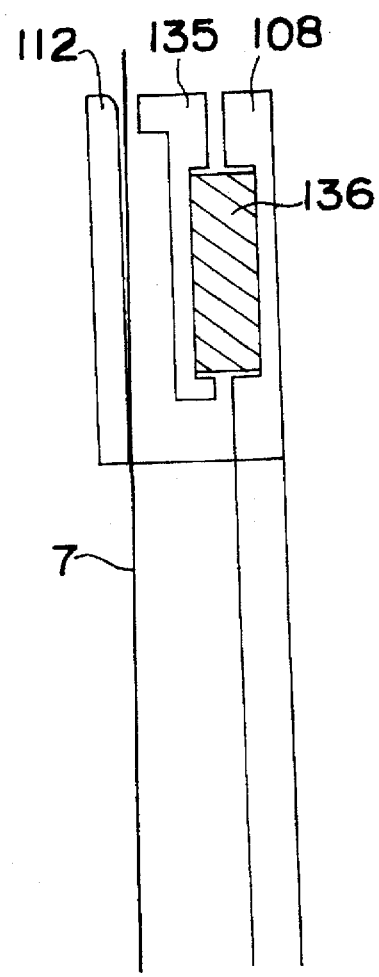
FIG. 15 is a sectional view taken along the line X—X of FIG. 13.
Figure 16:
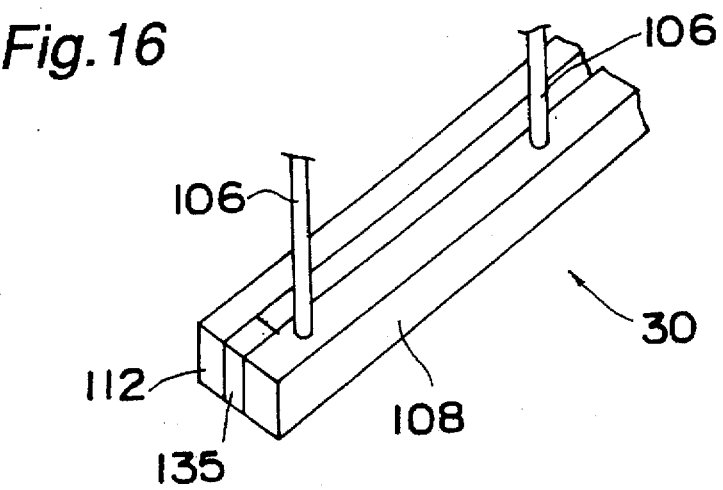
FIG. 16 is a partial perspective view of the pinch means of the producing apparatus of FIG. 10.
Figure 17:
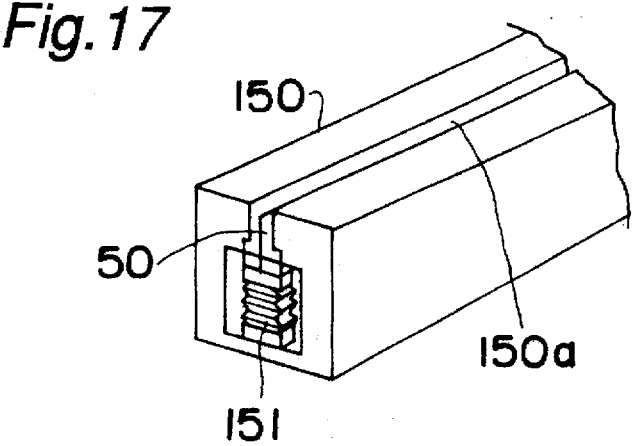
FIG. 17 is a partial perspective view showing an example of the cutting means to be used in the producing apparatus of FIG. 10, where the cutting edge is housed in a cutting edge housing member.
Figure 18:
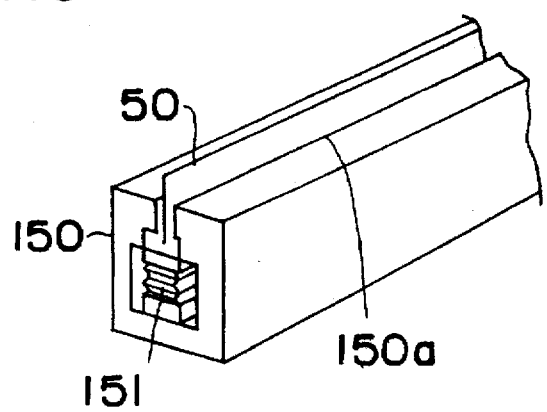
FIG. 18 is a partial perspective view of the cutting means of FIG. 17, where the cutting edge is exposed from the cutting edge housing member.

The cutting means 5 is not limited to the above arrangement but may be arranged in such a way as shown in FIGS. 17 and 18, where an air cylinder 151 similar to that in FIG. 12 is provided in a cutting edge housing member 150 and the cutting edge 50 is housed in a groove 150a of the cutting edge housing member 150. In this case, when the air cylinder 151 is contracted as shown in FIG. 17, the cutting edge 50 is housed in the groove 150a so that the tip of the cutting edge 50 is not protruded from the cutting edge housing member 150, whereby the pattern film 7 is prevented from being erroneously cut off. On the other hand, when the air cylinder 151 is expanded as shown in FIG. 18, the tip of the cutting edge 50 is protruded from the groove 150a so that the pattern film 7 can be cut off.

Figure 19:
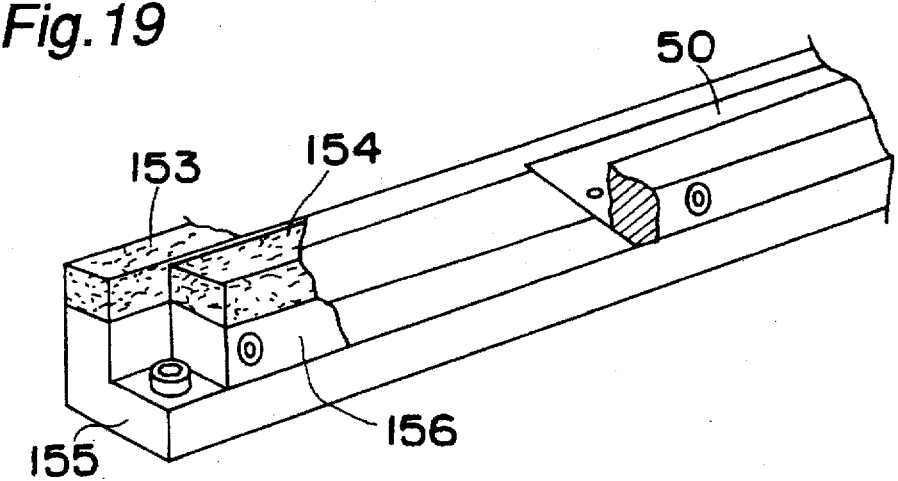
FIG. 19 is a partly broken away perspective view showing another example of the cutting means to be used in the producing apparatus of FIG. 10.

Resembling the cutting means of FIGS. 9A and 9B as it is, the cutting means 5 may also be arranged in the following way. That is, as shown in FIG. 19, the cutting edge 50 is housed between an L-shaped first cutting-edge fixture 155 and a rectangular-parallelepiped shaped second cutting-edge fixture 156, while a first sponge 153 and a second sponge 154, both of relatively hard type, are fixed at the surface of the first cutting-edge fixture 155 and the surface of the second cutting-edge fixture 156, respectively. Thus, the tip of the cutting edge 50 is normally kept from exposure by the first sponge 153 and the second sponge 154. Meanwhile, when the cutting means 5 is pressed against the main clamp means 4, the first sponge 153 and the second sponge 154 are compressed so that the tip of the cutting edge 50 is exposed whereby the pattern film 7 is cut off.

Figure 22:
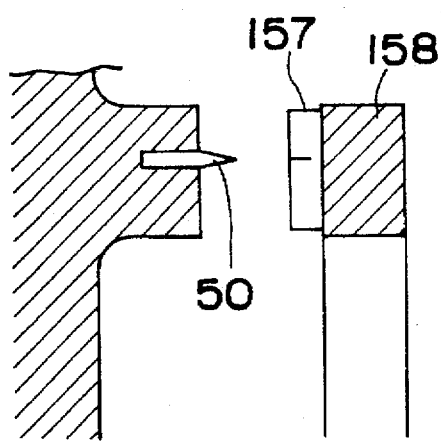
FIG. 22 is a partial enlarged sectional view showing still another example of the cutting means to be used in the producing apparatus of FIG. 10.

Further, the cutting means 5 may also be arranged in the following way. As shown in FIG. 22, after cutting off the pattern film 7, the tip of the cutting edge 50 fixed to the first mold A will enter a cutting edge receiving member 157 made of rubber or polycarbonate and provided at the first-mold-side surface of the upstream clamp head 158 of the main clamp means 4, so that the edge tip of the cutting edge 50 is prevented from being brought into direct contact with the clamp head 40.

Figure 23:
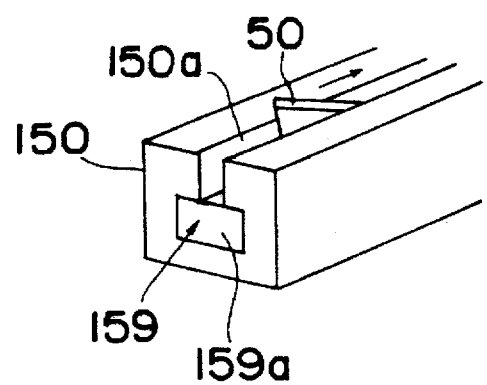
FIG. 23 is a partial enlarged perspective view showing yet another example of the cutting means to be used in the producing apparatus of FIG. 10.
Figure 24:
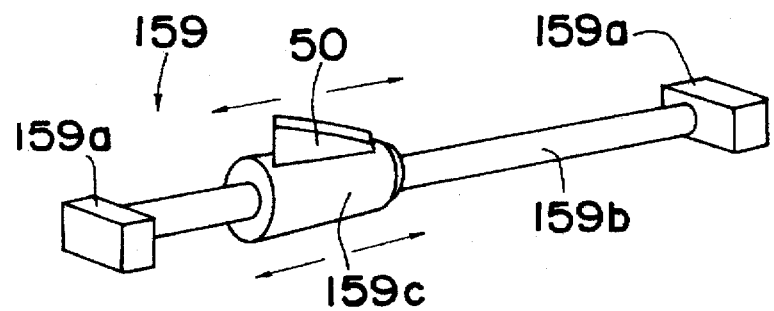
FIG. 24 is a perspective view showing part of the cutting means of FIG. 23.

Furthermore, as shown in FIGS. 23 and 24, a rodless cylinder 159 may be provided instead of the air cylinder 151 in the cutting edge housing member 150 of FIGS. 17 and 18. That is, the rodless cylinder 159 may be arranged in such a way that a movable part 159c reciprocates along a rod 159b provided between supporting parts 159a at both ends, where the pattern film 7 is cut off by a cutting edge 50 fixed to the movable part 159c. This cutting edge 50 cuts the pattern film 7 by the movable part 159c moving from one end to the other end of the pattern film 7 in the widthwise direction of the film.

Figure 20:
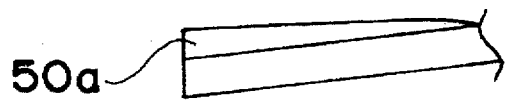
FIG. 20 is a partial front view of an example of the cutting edge of the above cutting means.
Figure 21:
FIG. 21 is a partial front view of another example of the cutting edge of the above cutting means.

In various embodiments as shown in FIGS. 1 through 19 and FIG. 22, the cutting edge 50 has a length not less than the width of the pattern film 7 so that it can cut the pattern film 7 at one time throughout the width of the film. This type of cutting edge 50 is not limited to rectangular-shaped ones but may also be a cutting edge whose edge portion 50a is inclined as shown in FIG. 20, a cutting edge of a saw-tooth shape as shown in FIG. 21, or the like.

In contrast to this, the cutting edge 50 as shown in FIG. 23 cuts the pattern film 7 by the movable part 159c moving from one end to the other end of the pattern film 7 in its widthwise direction.

The sub-clamp means 6 fixes the cut-off end portion 70 of the pattern film 7 introduced between the female mold 11 and the male mold 13 by the film introducing means 3, at the downstream side of the female mold recess 10. A rod-shaped sub-clamp means 6 is available.

Figure 26:
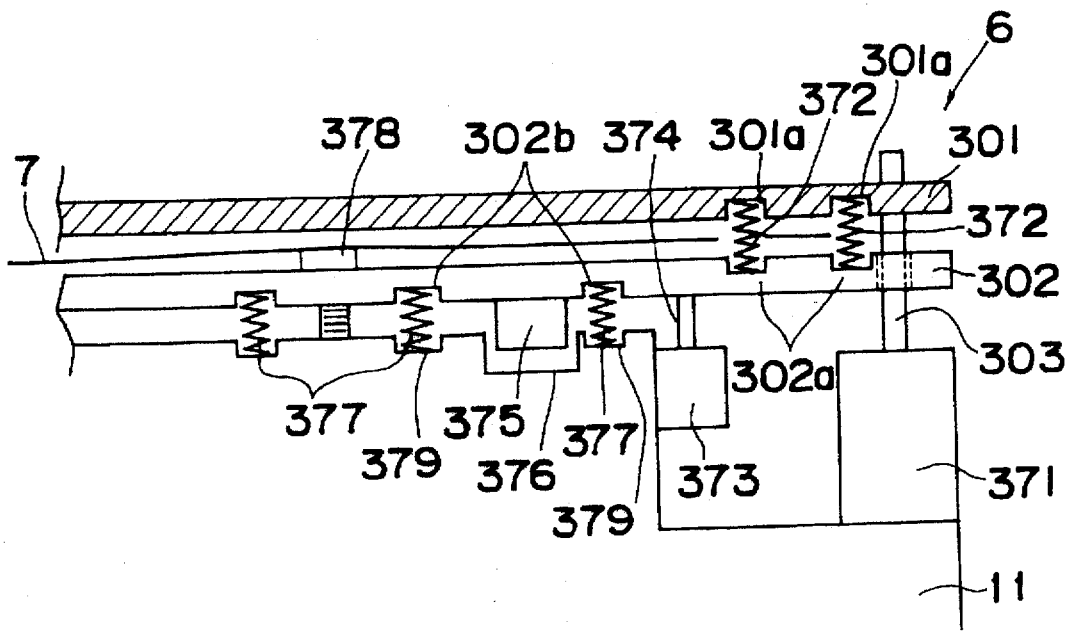
FIG. 26 is a partial sectioned plan view of a sub-clamp is means of the producing apparatus of FIG. 10.
Figure 27:
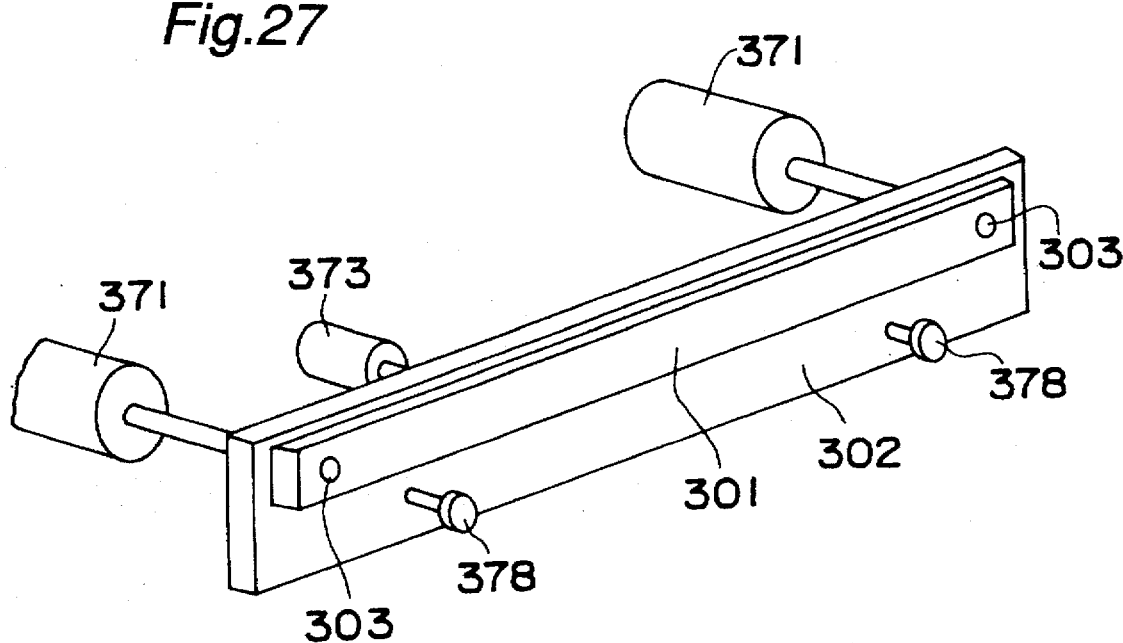
FIG. 27 is a perspective view of the sub-clamp means of FIG. 26.

An actual example of the sub-clamp means 6 is shown in FIGS. 26 and 27. Referring to FIG. 26, the sub-clamp means 6 generally comprises a sub-clamp upper plate 301 and a sub-clamp lower plate 302 which can pinch the pattern film 7 therebetween, two first air cylinders 371, one second air cylinder 373, and a plurality of springs 372, 377. Each first air cylinder 371 is fixed to the female mold 11, and has the sub-clamp upper plate 301 fixed at an end of its air cylinder rod 303. The second air cylinder 373 is fixed to the female mold 11, and has an end of its air cylinder rod kept in contact with the sub-clamp lower plate 302. The plurality of springs 372 are provided between a recess 301a of the sub-clamp upper plate 301 and a recess 302a of the sub-clamp lower plate 302, and exerts a bias to open the sub-clamp upper plate 301 and the sub-clamp lower plate 302 from each other. The plurality of springs 377 are provided between a recess 379 of the female mold 11 and a recess 302b of the sub-clamp lower plate 302, and exerts a bias to open the female mold 11 and the sub-clamp lower plate 302 from each other. A rail 375 is fixed on the sub-clamp lower plate 302 on one side thereof close to the female mold and extends in a direction perpendicular to the paper surface of FIG. 26, so as to be slidably fitted to a rail guide 376 recessed in the female mold 11. With this arrangement, the rail 375 guides the sub-clamp lower plate 302 upward and downward in FIG. 26 when the sub-clamp lower plate 302 is brought into or out of contact with the female mold 11.

The sub-clamp means 6 having the above-described arrangement operates in the following way. With two fixing screws 378 loosened, the sub-clamp means 6 is manually positioned in the vertical direction of FIG. 27. Then, with the two fixing screws 378 tightened, the sub-clamp lower plate 302 and the female mold 11 are fixed so as not to be shifted from each other in the vertical direction of FIG. 27. Then, each first air cylinder 371 is driven so that the rod 303 of each first air cylinder 371 is pulled into the air cylinder body, whereby the pattern film 7 is pinched between the sub-clamp upper plate 301 and the sub-clamp lower plate 302 against the biasing force of the springs 372. Further, by the rod 303 of each first air cylinder 371 being pulled into the air cylinder body, the sub-clamp lower plate 302 is brought into contact with the female mold 11 against the biasing force of the springs 377. As a result, the lower end or the cut-off end portion 70 of the pattern film 7 is fixed by the sub-clamp means 6. in addition, if the second air cylinder 373 is driven at the time when the pattern film 7 is pinched between the sub-clamp upper plate 301 and the sub-clamp lower plate 302, so that the sub-clamp lower plate 302 is biased and moved toward the sub-clamp upper plate 301, then the pattern film 7 can be more reliably fixed by the sub-clamp upper plate 301 and the sub-clamp lower plate 302.

Figure 4:
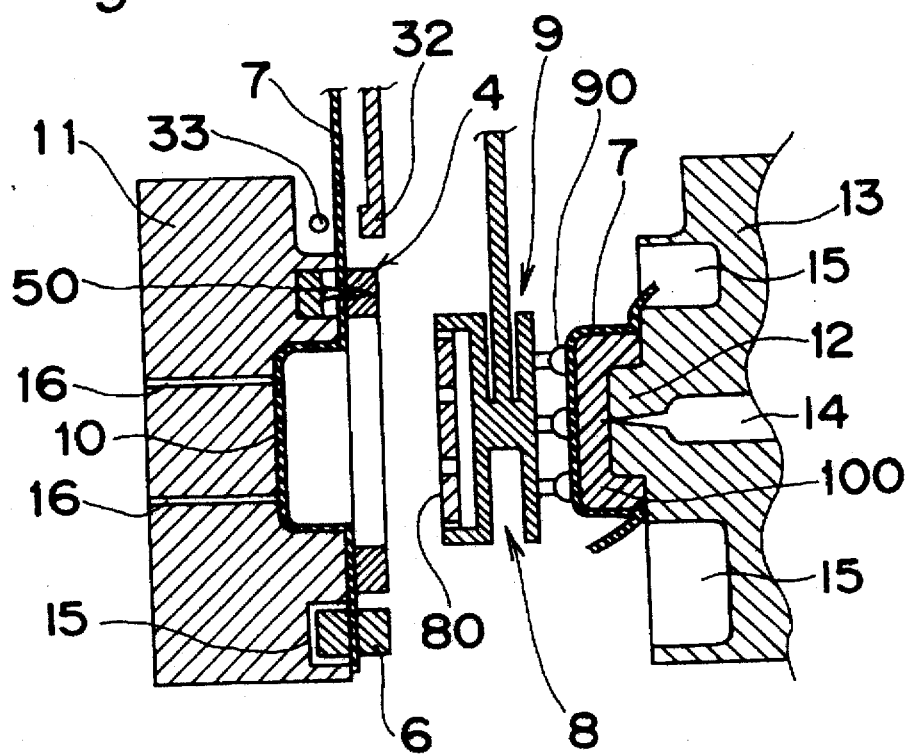
FIG. 4 is a schematic sectional view of the apparatus and method for producing insert molded articles according to the foregoing embodiment of the present invention, in a state where before molten resin is injected, a film heating device is inserted between the molds and the pattern film is heated so as to be softened, and moreover the pattern film is vacuum-sucked through vacuum suction holes so as to be put into close contact with the inner surface of the recess of the female mold.
Figure 5:
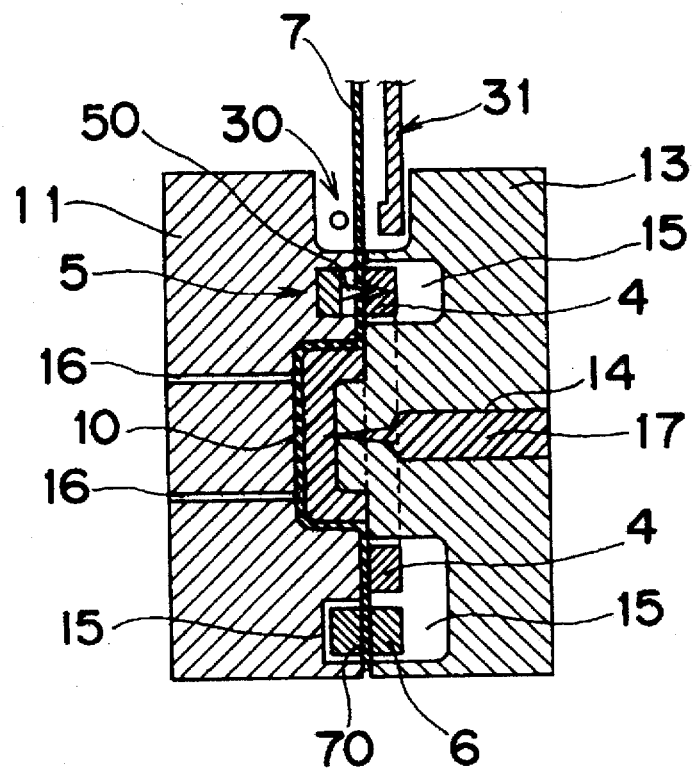
FIG. 5 is a schematic sectional view of the apparatus and method for producing insert molded articles according to the foregoing embodiment of the present invention, in a state where, with the female mold and the male mold closed, the molten resin is being injected.
Figure 6:
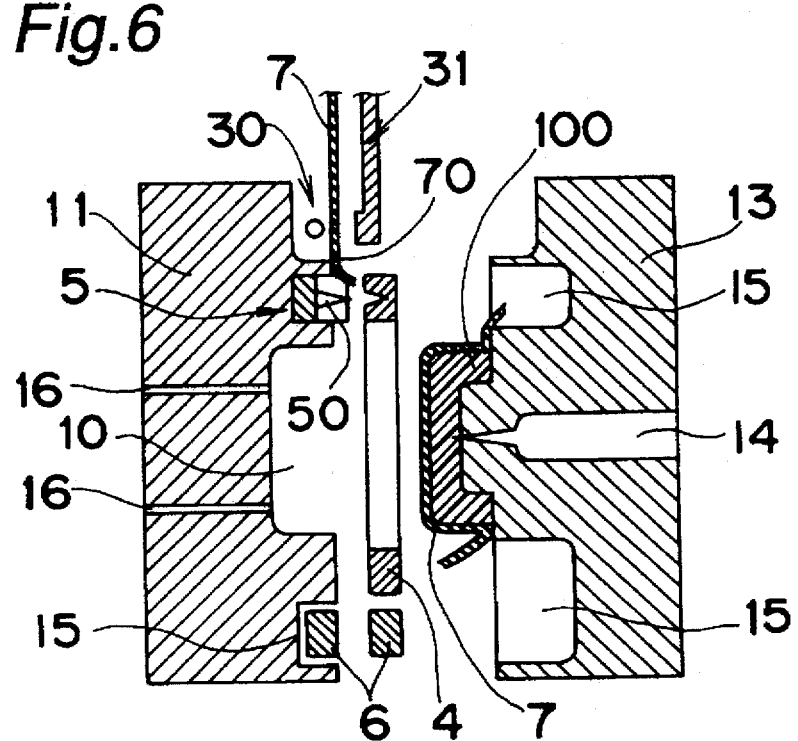
FIG. 6 is a schematic sectional view showing the apparatus and method for producing insert molded articles according to the foregoing embodiment of the present invention, in a state where the pattern film is released from being pressed by the main clamp means while the molds are opened.

The apparatus for producing patterned molded articles according to the above embodiment of the present invention may incorporate as an attachment a film heating device 8 that is moved in and out between the female mold 11 and the male mold 13 (FIG. 4). The film heating device 8, which may be a hot plate 80, a hot air blower, or the like, serves a function that the pattern film 7 positioned on the surface of the female mold 11 is previously softened so as to be easily put into close contact with the inner surface of the female mold recess 10 when done so with air sucked through the vacuum suction holes 16 provided at the inner surface of the female mold recess 10.

The apparatus for producing patterned molded articles according to the above embodiment of the present invention may also incorporate as an attachment a patterned molded article take-out device 9 that moves in and out between the female mold 11 and the male mold 13 (FIG. 4). The patterned molded article take-out device 9 has a molded article holding means, such as suction cups 90, provided on the rear side of the film heating device 8, and serves for taking out the patterned molded article remaining on the projection 12 of the male mold 13 before and after the heating of the pattern film 7.

The pattern film 7 is a lamination formed by stacking a pattern layer, a bonding layer, and the like one after another on an elongated substrate sheet. The pattern layer is a layer that imparts decorative and functional properties to the surface of the molded article. The pattern layer is, for example, an electrically conductive pattern formed from an ordinary print pattern or electrically conductive material. The bonding layer is a layer for bonding the pattern film 7 and the molded article with each other. The pattern film 7 used in the apparatus for producing patterned molded articles according to the above embodiment of the present invention is wound around the unwind roll means 2 on its upstream side, and formed into the cut-off end portion 70 on its downstream side.

Next, the method for producing patterned molded articles according to one embodiment of the present invention is described by using the apparatus for producing patterned molded articles and the pattern film 7 as described hereinabove.

First, the cut-off end portion 70 of the pattern film 7 is grasped by the pinch means 30 of the film is introducing means 3. The pattern film 7 may be grasped at a position slightly spaced from the cut-off end portion 70 or at the very end of the cut-off end portion 70.

Next, the pinch means 30, which has grasped the cut-off end portion 70 of the pattern film 7, is moved downstream of the female mold recess 10 by the driving means 31 of the film introducing means 3 (see FIG. 1). By moving the pinch means 30, the pattern film 7 is introduced between the main clamp means 4 and the female mold 11, where the pattern of the pattern film 7 is positioned in front of the female mold recess 10. With the driving means 31 linked with a positioning sensor, the pattern film 7 is located at a correct position relative to the female mold recess 10.

Figure 2:
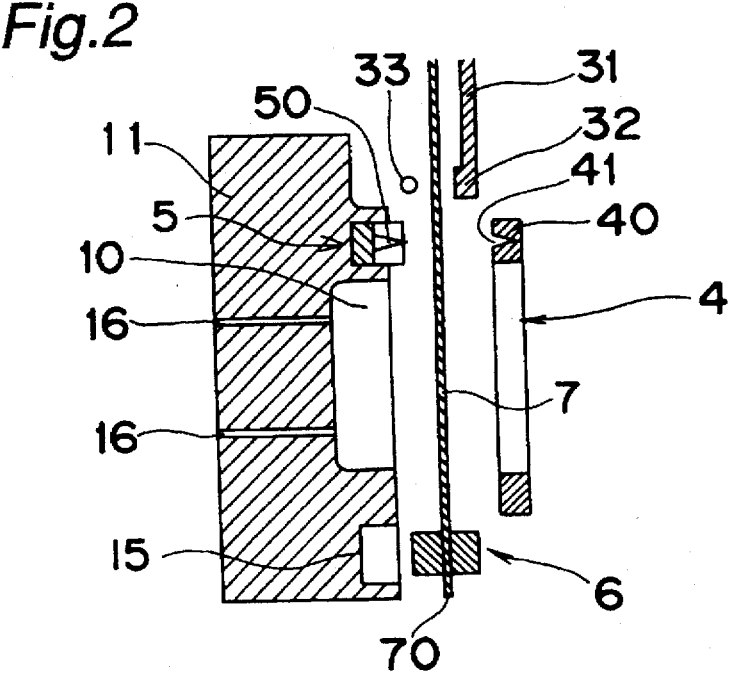
FIG. 2 is a schematic sectional view showing the apparatus and method for producing insert molded articles according to the foregoing embodiment of the present invention, in a state where a cut-off end portion of the pattern film, after being moved toward the downstream side of the recess of a female mold by a film introducing means, is fixed by a sub-clamp means.

Next, the cut-off end portion 70 of the pattern film 7 is fixed to the sub-clamp means 6 (see FIG. 2).

Next, the pinch head 32 and the pinch roll 33 of the pinch means 30 are pulled off so that the pattern film 7 is released.

Next, the pinch means 30 is withdrawn from between the main clamp means 4 and the female mold 11 by the driving means 31.

Figure 3:
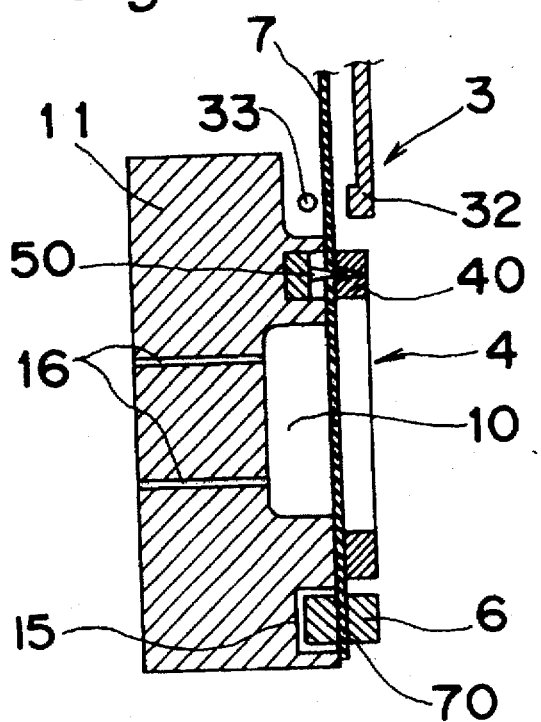
FIG. 3 is a schematic sectional view of the apparatus and method for producing insert molded articles according to the foregoing embodiment of the present invention, in a state where the pattern film, after the film introducing means has been drawn out from between the molds, is pressed against the periphery of the recess of the female mold by a main clamp means.

Next, the pattern film 7 is pressed against the periphery of the female mold recess 10 by the main clamp means 4 (see FIG. 3).

Simultaneously when or after the pattern film 7 is pressed against the periphery of the female mold recess 10 by the main clamp means 4, the pattern film 7 is cut off on the upstream side of the female mold recess 10.

The cutting process may also be implemented by the female mold 11 having the cutting edge 50 provided thereto and the main clamp means 4 having the cutting edge housing 41 provided to the upstream clamp head 40. Otherwise, after the pattern film 7 is pressed against the periphery of the female mold recess 10 by the main clamp means 4, the cutting process may be accomplished either by means of both the female mold 11 having the cutting edge 50 provided thereto and the male mold 13 having a cutting edge housing provided thereto, or by a sheet cutting process effected by the cross-passing of edges of the female mold 11 and the male mold 13.

The tension applied to the entire surface of the pattern film 7 is normally held constant between the unwind roll means 2 and the film introducing means 3, between the unwind roll means 2 and the sub-clamp means 6, and between the unwind roll means 2 and the main clamp means 4.

If the cutting means 5 is as shown in FIG. 9A, in which the tip of the cutting edge 50 is protruded from the surface of the female mold and the protruding portion of the cutting edge 50 is covered with the sponge 52, then the pattern film 7 is pressed against the surface of the female mold 11 by the main clamp means 4 as shown in FIG. 9D so that the sponge 52 that covers the tip of the cutting edge 50 is pushed down by the pattern film 7, whereby the tip of the cutting edge 50 is exposed and the pattern film 7 is thereby cut off.

In addition, the pressing and the cutting-off of the pattern film 7 by the main clamp means 4 may be done either at the same time or separately. When the processes are done separately, either process may be done first.

When they are done at the same time, it is appropriate that the cutting edge 50 is provided upstream of the female mold recess 10 while the cutting edge housing 41 is provided on the upstream clamp head 40 of the main clamp means 4, in which arrangement the pattern film 7 is pressed and cut off by the main clamp means 4 at the same time.

Further, it may also be arranged that, after the pattern film 7 is pressed against the female mold 11 by the main clamp means 4, the film heating device 8 is inserted between the male mold 13 and the female mold 11 before molten resin is injected, so that the pattern film 7 is softened by heating, and moreover the pattern film 7 is vacuum-sucked through the vacuum suction holes 16 so as to be brought into close contact with the inner surface of the female mold recess 10 (see FIG. 4).

Next, the female mold 11 and the male mold 13 are closed, and the molten resin 17 is injected. At the stage when the molten resin 17 is injected, the pattern film 7 may be either in close contact or out of close contact with the surface of the female mold recess 10. When it is out of close contact, the pattern film 7 will be brought into close contact with the inner surface of the female mold recess 10 by injection pressure of the molten resin 17.

Next, the pattern film 7 that has been pressed by the main clamp means 4 is released, while the female mold 11 and the male mold 13 are opened. A molded article produced with the pattern film 7 formed thereon may remain either on the projection 12 of the male mold 13 or in the female mold recess 10. In addition, when the patterned molded article take-out device 9, such as the suction cups 90, is provided on the rear side of the film heating device 8, a patterned molded article 100 may be taken out by suction applied to the molded article with the pattern film 7 formed thereon by the suction cups 90 after the pattern film 7 has been completely heated by the film heating device 8. or the patterned molded article 100 may be taken out simultaneously when the film heating device 8 is withdrawn from between the female mold 11 and the male mold 13 after the molded article with the pattern film 7 formed thereon is grasped by the suction cups 90 and then, in such state, the pattern film 7 is heated by the film heating device 8.

In the present invention, before the pattern film is pressed by the main clamp means against the periphery of a cavity-forming portion, for example a recess, of the first mold, the cut-off end portion of the pattern film is fixed to the sub-clamp means and a certain level of tension is applied to the pattern film. As a result, the pattern film can be stretched uniformly over its entire surface when the pattern film is brought into close contact with the inner surface of the aforementioned recess of the first mold.

In the present invention, the pattern film is cut off on the upstream side of the recess of the first mold. Therefore, it is sufficient to cut the pattern film at only one portion thereof, i.e. on the upstream side. This means that the pattern film is not required to be cut at four portions, that is, the downstream and both sides of the pattern film do not need to be cut.

Also, in the present invention, since the cutout pattern film will never be re-wound, it is unnecessary to allow for any excess margins at both sides of the pattern film. Moreover, no wind-up roll is required.

In the present invention, which has the arrangements and functions as described above, when the is pattern film is put into close contact with the inner surface of the cavity-forming portion, for example a recess, of the first mold, the pattern film can be stretched uniformly over the entire surface, so that the pattern film can be prevented from being put into close contact with the recess portion of the first mold with wrinkles or twists generated in the pattern film.

Also, in the present invention, it is sufficient to cut off the pattern film at only one portion thereof, i.e. upstream thereof. Accordingly, cut chips will be less likely to occur and less likely to enter the injection mold, so that the resulting injection molded article is lres from deposition of cut chips, leading to a higher rate of non-defective products.

Further, in the present invention, since an upstream portion of the pattern film is cut off, there is 5 no need of later rewinding the film. As a result, it is unnecessary to allow larger margins for the width of both sides of the pattern film, so that waste film can be reduced. Moreover, since a roll for winding up the pattern film is not required, cost of the pattern film and cost of the system can be reduced, economically. Furthermore, the system becomes compact and easy to handle.

Further, in the present invention, since the pattern film is cut on the upstream side of the surface of the first mold by the drive of the cutting means based on is the drive of the main clamp means, excess pattern film portions beyond the patterned molded article can be reduced to be extremely small.

Further, since the pattern film is cut on the upstream side of the surface of the first mold by the cutting means under the drive of the main clamp means, it is possible to cut the pattern film by bringing the cutting edge of the cutting means into contact with the pattern film after the pattern film is fixed at a location in close proximity to both surfaces of the cutting edge of the cutting means. As a result, the pattern film can be cut off reliably and cleanly. In other words, a portion of the pattern film at which the pattern film is pressed against the first mold by the main clamp means and a portion of the pattern film at which the pattern film is cut off by the cutting means can be put into proximity to each other, so that the pattern film can be cut by the cutting means with more simplicity, reliability, and cleanness.

Furthermore, in the present invention, since the pattern film can be cut by the cutting means with the drive of the main clamp means, it is unnecessary to provide a driving means for exclusive use of the cutting means. Although the present invention has been fully described in conjunction with the preferred embodiments thereof with reference to the accompanying drawings, it is to be noted that various changes and modifications will be apparent to those skilled in the art. Therefore, unless otherwise such changes and modifications depart from the scope of the present invention as defined by the appended claims, they should be construed as included therein.

I claim:

1. An apparatus for use in producing patterned molded articles, said apparatus comprising:
    an injection mold including a first mold and a second mold adapted to define therebetween a cavity into which is to be injected material to be molded;
    an unwind roll means for unwinding a pattern film;
    a film introducing means for introducing the pattern film unwound from said unwind roll means to between said first mold and said second mold in a direction from an upstream side toward a downstream side of a surface of said first mold, relative to a direction of unwinding of the pattern film;
    a first clamp means located between said first mold and said second mold for pressing the pattern film, which has been introduced by said film introducing means, against said surface of said first mold;
    a cutting means, disposed either at a specified position at said upstream side of said surface of said first mold or at a specified position of said first clamp means opposite to said upstream side, for cutting off the pattern film on said upstream side of said surface of said first mold when the pattern film is pressed against said first mold by said first clamp means;
    a second clamp means, disposed at said downstream side of said surface of said first mold, for fixing a cut-off end portion of the pattern film; and
    said film introducing means having a pinch means for grasping the cut-off end portion of the pattern film and a pinch means-driving means for reciprocatingly moving said pinch means between said upstream side and said downstream side of said first mold.

2. An apparatus according to claim 1, wherein said cutting means is positioned and operable to cut off the pattern film at said upstream side of said surface of said first mold when the pattern film is pressed against said first mold by said first clamp means and when said first mold and said second mold are closed.

3. An apparatus according to claim 2, wherein said first mold is a female mold having a recess, and said second mold is a male mold having a projection fittable into said recess.

4. An apparatus according to claim 2, wherein said cutting means is a cutting edge.

5. An apparatus according to claim 2, wherein said cutting means is positioned and operable to cut off the pattern film on said upstream side of said surface of said first mold after the cut-off end portion of the pattern film is fixed by said second clamp means and when the pattern film is pressed against said first mold by said first clamp means.

6. An apparatus according to claim 1, wherein said first mold is a female mold having a recess, and said second mold is a male mold having a projection fittable into said recess.

7. The apparatus according to claim 6, wherein said cutting means is a cutting edge.

8. An apparatus according to claim 6, wherein said cutting means is positioned and operable to cut off the pattern film on said upstream side of said surface of said first mold after the cut-off end portion of the pattern film is fixed by said second clamp means and when the pattern film is pressed against said first mold by said first clamp means.

9. An apparatus according to claim 1, wherein said cutting-means is a cutting edge.

10. An apparatus according to claim 9, wherein said cutting means is positioned and operable to cut off the pattern film on said upstream side of said surface of said first mold after the cut-off end portion of the pattern film is fixed by said second clamp means and when the pattern film is pressed against said first mold by said first clamp means.

11. An apparatus according to claim 1, wherein said cutting means is positioned and operable to cut off the pattern film on said upstream side of said surface of said first mold after the cut-off end portion of the pattern film is fixed by said second clamp means and when the pattern film is pressed against said first mold by said first clamp means.

12. A method for producing patterned molded articles by using an apparatus including an injection mold having a first mold and a second mold to define therebetween a cavity into which is injected material to be molded, an unwind roll means unwinding a pattern film, a film introducing means for introducing the pattern film unwound from the unwind roll means to between the first mold and the second mold in a direction from an upstream side toward a downstream side of a surface of the first mold, relative to a direction of unwinding of the pattern film, a first clamp means located between the first mold and the second mold for pressing the pattern film which has been introduced by the film introducing means against the surface of the first mold, a cutting means, disposed either at a specified position on the upstream side of the surface of the first mold or at a specified position of the first clamp means opposite to the upstream side, for cutting off the pattern film on the upstream side of the surface of the first mold when the pattern film is pressed against the first mold by the first clamp means, a second clamp means disposed on the downstream side of the surface of the first mold for fixing a cut-off end portion of the pattern film, the film introducing means having a pinch means for grasping the cut-off end portion of the pattern film and a pinch means-driving means for reciprocatingly moving the pinch means between the upstream side and the downstream side of the first mold, said method comprising steps of:
    grasping said cut-off end portion of said pattern film by said pinch means;
    moving said pinch means, which has grasped said cut-off end portion of said pattern film, by drive of said pinch means-driving means in a direction from said upstream side toward said downstream side of said surface of said first mold;
    fixing said cut-off end portion of said pattern film by said second clamp means;
    releasing said pattern film from said pinch means and withdrawing said pinch means from between said first clamp means and said first mold by said pinch means-driving means;
    pressing said pattern film against said surface of said first mold by drive of said first clamp means and, when or after said pressing, cutting off said pattern film at said upstream side of said surface of said first mold by said cutting means;

injecting molten resin into said cavity formed by mold-closing said first mold and said second mold; and releasing said pattern film from said first clamp means, thereby obtaining a patterned molded article.

13. A method according to claim 12, wherein said cutting comprises pressing said pattern film against said surface of said first mold by drive of said first clamp means or by closure of said first mold and said second mold, and cutting said pattern film at said upstream side of said surface of said first mold by said cutting means simultaneously with closure of said first mold and said second mold.

14. A method according to claims 13, wherein said first mold is a female mold having a recess, and said second mold is a male mold having a projection fittable into said recess.

15. A method according to claim 14, further comprising, after said pattern film is pressed against said surface of said first mold by said first clamp means, inserting a film heating device between said first mold and said second mold and heating said pattern film, and applying suction to said pattern film to urge said pattern film into said recess of said first mold.

16. A method according to claim 13, further comprising, after said pattern film is pressed against said surface of said first mold by said first clamp means, inserting a film heating device between said first mold and said second mold and heating said pattern film, and applying suction to said pattern film to urge said pattern film toward said first mold.

17. A method according to claim 12, wherein said first mold is a female mold having a recess, and said second mold is a male mold having a projection fittable into said recess.

18. A method according to claim 17, further comprising, after said pattern film is pressed against said surface of said first mold by said first clamp means, inserting a film heating device between said first mold and said second mold and heating said pattern film, and applying suction to said pattern film to urge said pattern film into said recess of said first mold.

19. A method according to claim 12, further comprising, after said pattern film is pressed against said surface of said first mold by said first clamp means, inserting a film heating device between said first mold and said second mold and heating said pattern film, and applying suction to said pattern film to urge said pattern film toward said first mold.

* * * * *